United States Patent Office 3,411,880
Patented Nov. 19, 1968

3,411,880
RECOVERY OF HIGH PURITY MAGNESIUM
OXIDE AND CALCIUM OXIDE FROM MAGNESITE AND CALCITE ORES
George Adrian Kent, Ottawa, Ontario, Canada, assignor to Canadian Patents and Development Limited, Ottawa, Ontario, Canada, a corporation of Canada
No Drawing. Filed Aug. 23, 1965, Ser. No. 481,922
8 Claims. (Cl. 23—186)

ABSTRACT OF THE DISCLOSURE

The invention contemplates the recovery of magnesium oxide and calcium oxide from magnesite and calcite ores of a purity not heretofore readily available. A body of one of these ores is initially heated to a temperature of 400–900° C. and then digested with acetic acid in water at a temperature of 65–80° C. to form a solution containing magnesium or calcium acetate and coagulated insoluble particles. These particles are removed from the resulting filtrate and the residue heated to about 550–1000° C. to form the desired oxide.

---

This invention relates to the recovery of high purity materials from magnesite and calcite ores, and more particularly to the recovery of magnesium oxide from magnesite and calcium oxide from calcite.

It is an object of this invention to provide a process for recovering high purity materials from magnesite and calcite ores which may be conducted in a more convenient and more effective manner than has heretofore been practiced or proposed.

The starting material of the present invention comprises crushed natural ore or concentrates thereof and it will be understood that the term "ore" as employed throughout this specification and appended claims includes the natural ore and its concentrates. The mesh size of the ore body to be treated is in conventional range and is sufficiently small to permit an effective leaching treatment over a reasonable time period. A suitable size is —28 (Tyler Standard).

In the treatment of magnesite, it is essential that it be heated or calcined to render it soluble in acetic acid. The material under treatment must be substantially $CO_2$ free to ensure desired recovery. Heating to a temperature of 900° C. is effective. While lower temperatures may be employed, they would require a longer heat treatment. The heating temperature must be above the decomposition point for magnesite (about 400° C.).

In the treatment of calcite, pre-calcination is not essential since calcite is soluble in acetic acid. However, it is desirable to subject calcite to a pre-calcination step (say, at about 900° C.) since such a step results in increased recovery.

The material under treatment is now subjected to a leaching step with acetic acid. To this end, the material is digested at 65–80° C. with acetic acid in water. A preferred leaching temperature is about 70° C. at which coagulation of insoluble particles and settling is pronounced. It is preferable not to leach at above 80° C. to ensure that iron is not taken into solution. The acetic acid is employed somewhat in excess of that required. The ratio of acetic acid to magnesium carbonate is about 1.4 to 1.0. The amount of magnesium carbonate in the ore must first be determined. Furthermore, the ratio of acetic acid to calcium carbonate is about 1.2 to 1.0. Thus, it will be appreciated that the quantity of acetic acid to be added depends upon the analysis of the ores under treatment.

Following the leaching step, the resulting solution is filtered and the filtrate containing magnesium or calcuim acetate is subjected to an evaporation procedure to remove at least the major portion of the water therein. The residue may be in the form of a thin syrup or a dry product.

This residue is now heated to decompose the formed magnesium or calcium acetate and to burn off the resulting carbon. The heating temperature is preferably of the order of 1000° C. However, it will be apparent that a lower temperature (but above the decomposition temperature of the acetate) may be employed with a surplus of oxygen over a sufficient period of time. Thus, a temperature range of 550–1000° C. may be said to be satisfactory for the purpose.

The product of the process described is at least of 98% purity and generally is of 99% plus purity.

The following examples are illustrative:

EXAMPLE I

A 20 gram sample of magnesite flotation concentrate containing 46.3% MgO, 2.72% $Fe_2O_2$ and 0.47% $SiO_2$ was heated to 90° C. and then digested at 70° C. with 28 ml. of glacial acetic acid in 400 ml. of water. This was filtered and the filtrate evaporated to dryness, then ignited at 1000° C. It was found that 96.2% of the MgO in the sample had been removed by the acetic acid. This contained 0.00 15% $Fe_2O_3$, 0.03% $SiO_2$ (approximately) and 0.46% CaO, the MgO by difference being 99.51%.

EXAMPLE II

A 20 gram sample of magnesite flotation concentrate containing 46.3% MgO, 2.72% $Fe_2O_3$ and 0.47% $SiO_2$ was heated to 900° C. and then digested at 70° C. with 30 ml. of glacial acetic acid in 400 ml. of water. After filtering, the filtrate was evaporated to dryness and ignited at 1000° C. In this case, 97.2% of the MgO in the sample was found to have been removed by the acetic acid. The product contained 0.0059% $Fe_2O_3$, 0.03% $SiO_2$ (approximately) and 0.46% CaO, the MgO by difference being 99.51%.

EXAMPLE III

A 20 gram sample of magnesite ore containing 27.50% MgO from magnesite, 4.75% $Fe_2O_3$, and 28.54% $SiO_2$ was heated to 900° C., digested with 15 ml. of glacial acetic acid in 400 ml. of water at 70° C., filtered, and the filtrate evaporated to dryness, then ignited at 1000° C. It was found that 91.5% of the MgO from magnesite in the sample had been removed by the acetic acid. This contained 0.0014% $Fe_2O_3$, 0.18% $SiO_2$ and approximately 0.5% CaO, the MgO by difference being 99.31%.

EXAMPLE IV

A 20 gram sample of another magnesite ore containing 18.66% MgO from magnesite, 9.06%, $Fe_2O_3$ and 32.01% $SiO_2$ was heated to 900° C., digested with 15 ml. of glacial acetic acid in 400 ml. of water, filtered, and the filtrate evaporated to dryness then ignited at 1000° C. It was found that 88.5% of the MgO from magnesite in the sample had been removed by the acetic acid. This contained 0.0044% $Fe_2O_3$, 1.00% $SiO_2$ and approximately 0.5% CaO, the MgO by difference being 98.44%.

EXAMPLE V

A 20 gram sample of limestone containing 50.64% CaO from calcite, 0.52% $Fe_2O_3$ and 4.49% $SiO_2$ was heated to 900° C., digested with 25 ml. of glacial acetic acid in 400 ml. of water at 70° C., filtered, and the filtrate evaporated to dryness, then ignited at 1000° C. It was found that virtually all of the CaO from calcite present in the sample had been removed by the acetic acid and that this contained 0.0048% $Fe_2O_3$, 0.57% $SiO_2$ and 1.41% MgO, the CaO by difference being 98.01%.

EXAMPLE VI

A 20 gram sample of limestone containing 50.64% CaO from calcite, 0.52% $Fe_2O_3$ and 4.49% $SiO_2$ was digested at 70° C. with 25 ml. (representing a considerable excess) of glacial acetic acid without prior calcining. This was filtered, and the filtrate evaporated to dryness then ignited at 1000° C. It was found that 90.8% of the CaO from calcite in this sample had been removed by the acetic acid, and it contained 0.139% $Fe_2O_3$, 0.017% $SiO_2$ and 1.46% MgO, the CaO by difference being 98.38%.

I claim:

1. A process for recovering high purity products from magnesite and calcite ores which comprises heating a body of one of said ores to a temperature of 400–900° C., digesting said body with acetic acid in water at a temperature of 65–80° C. to form a solution containing magnesium or calcium acetate and coagulated insoluble particles, filtering the solution body to remove said particles therefrom, removing at least a major portion of the water in the resulting filtrate, and heating the residue at a temperature of about 550–1000° C. to decompose said acetate and burn off resultant carbon, and to form magnesium or calcium oxide.

2. A process for recovering high purity products from magnesite and calcite ores as defined in claim 1, wherein said first heating temperature is about 900° C., said digesting temperature is about 70° C., and said second heating temperature is about 1000° C.

3. A process for recovering high purity products from magnesite and calcite ores as defined in claim 1, wherein said acetic acid is employed in excess of that required to convert substantially all magnesium or calcium carbonate present to acetate.

4. A process for recovering high purity products from magnesite and calcite ores as defined in claim 3, wherein the ratio of said acetic acid to magnesium carbonate in said ore is 1.4 to 1.0.

5. A process for recovering high purity magnesium oxide from magnesite which comprises heating a body of said magnesite to a temperature of 400–900° C. to render it substantially free of carbon dioxide, digesting said body with acetic acid in water at a temperature of 65–80° C. to form a solution containing magnesium acetate and coagulated insoluble particles, filtering said solution to remove said particles therefrom, removing at least a major portion of the water in the resulting filtrate, and heating the residue to a temperature of about 550–1000° C. to form magnesium oxide and burn off resultant carbon.

6. A process for recovering high purity magnesium oxide as defined in claim 5, wherein said first heating step is conducted at a temperature of about 900° C., and said acetic acid is employed in excess of that required to convert substantially all the magnesium carbonate present to magnesium acetate.

7. A process for recovering high purity calcium oxide from calcite which comprises digesting a crushed body of said calcite with acetic acid in water at a temperature of 65–80° C. to form a solution containing calcium acetate and coagulated insoluble particles, filtering said solution to remove said particles therein, removing at least a major portion of the water in the resulting filtrate, and heating the residue to about 1000° C. to form calcium oxide.

8. A process for recovering high purity calcium oxide from calcite as defined in claim 7, including the step of heating said calcite body prior to said digestion step to a temperature of 400–900° C.

References Cited
UNITED STATES PATENTS

| | | | |
|---|---|---|---|
| 1,542,684 | 6/1925 | Everhart | 23—201 X |
| 1,327,536 | 1/1920 | Elliott | 23—201 |
| 2,473,534 | 6/1949 | Lloyd | 23—201 |

EDWARD J. MEROS, *Primary Examiner.*